United States Patent
Karve et al.

(10) Patent No.: US 8,028,048 B2
(45) Date of Patent: Sep. 27, 2011

(54) METHOD AND APPARATUS FOR POLICY-BASED PROVISIONING IN A VIRTUALIZED SERVICE DELIVERY ENVIRONMENT

(75) Inventors: Alexei A. Karve, Mohegan Lake, NY (US); Ajay Mohindra, Yorktown Heights, NY (US); Alla Segal, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 760 days.

(21) Appl. No.: 11/679,223

(22) Filed: Feb. 27, 2007

(65) Prior Publication Data
US 2008/0209016 A1    Aug. 28, 2008

(51) Int. Cl.
G06F 15/16    (2006.01)
(52) U.S. Cl. ........ 709/221; 709/222; 709/224; 717/178; 718/107
(58) Field of Classification Search .................. 709/225, 709/222, 221, 224; 717/177, 178; 702/188; 718/107
See application file for complete search history.

(56) References Cited

U.S. PATENT DOCUMENTS

| | | | |
|---|---|---|---|
| 5,960,206 A * | 9/1999 | Barsness et al. ............... 717/174 |
| 6,125,396 A * | 9/2000 | Lowe ............................. 709/234 |
| 6,282,569 B1 | 8/2001 | Wallis et al. |
| 6,421,777 B1 * | 7/2002 | Pierre-Louis et al. ............ 713/2 |
| 6,460,082 B1 | 10/2002 | Lumelsky et al. |
| 2002/0062334 A1 | 5/2002 | Chen et al. |
| 2003/0069974 A1 | 4/2003 | Lu et al. |
| 2003/0084165 A1 | 5/2003 | Kjellberg et al. |
| 2003/0126202 A1 | 7/2003 | Watt |
| 2003/0187916 A1 | 10/2003 | Dettinger et al. |
| 2004/0054780 A1 | 3/2004 | Romero |
| 2004/0111506 A1 | 6/2004 | Kundu et al. |
| 2004/0139434 A1 | 7/2004 | Blythe et al. |
| 2004/0181476 A1 | 9/2004 | Smith et al. |
| 2004/0237088 A1 | 11/2004 | Miki et al. |
| 2005/0088976 A1 | 4/2005 | Chafle et al. |
| 2005/0108712 A1 | 5/2005 | Goyal |
| 2005/0125509 A1 | 6/2005 | Ramachandran |
| 2006/0070060 A1 | 3/2006 | Tantawi et al. |
| 2006/0080656 A1 * | 4/2006 | Cain et al. ..................... 717/174 |

(Continued)

OTHER PUBLICATIONS

"Xen User's Manual: Xen v3.0" [Online] Feb. 17, 2007 [Retrieved on: Nov. 16, 2009] University of Cambridge [Retrieved from: http://web.archive.org/web/20070219132606/http://www.cl.cam.ac.uk/research/srg/netos/xen/readmes/user/user.html].*

(Continued)

*Primary Examiner* — Philip Chea
*Assistant Examiner* — Eric W Shepperd
(74) *Attorney, Agent, or Firm* — Cahn & Samuels, LLP

(57) ABSTRACT

In a distributed computing network having computers interconnected with each other, a method and apparatus of providing policy based provisioning of middleware components to provide a solution for a service. With this invention, the middleware components that are necessary to provide the solution are determined. Then, the configurations of the computers are determined so as to satisfy a selected configuration policy for a selected solution. Finally, the necessary middleware components are installed on the configured computers so that the solution can be provided. Some of the selected configuration policies are: maximization of server utilization policy, provisioning of software components requiring external access based on availability of external resources, and minimization of total time to install said determined components. The progress of installation of the middleware components can also be monitored to make any necessary adjustments in the configuration of the virtual machines so that the selected configuration policy can be satisfied.

15 Claims, 9 Drawing Sheets

U.S. PATENT DOCUMENTS

2007/0106798 A1   5/2007  Masumitsu et al.
2007/0250833 A1*  10/2007  Araujo et al. .................. 718/1
2007/0271560 A1*  11/2007  Wahlert et al. .................. 718/1
2008/0040455 A1*  2/2008  MacLeod et al. ............. 709/220

OTHER PUBLICATIONS

Buytaert, Kris "Automating Xen Virtual Machine Deployment" [Online] Mar. 2006 [Retrieved: Nov. 17, 2009]howto.krisbuytaert.be [Retrieved From: http://howto.krisbuytaert.be/AutomatingVirtualMachineDeployment/].*

Chase, et al., "Dynamic Virtual Clusters in a Grid Site Manager", Proceedings of the 12th IEEE International Symposium on High Performance Distributed Computing, 2003.

Chess, et al., "Experience with Collaborating Managers: Node Group Manager . . . ", Proceedings of the Second International Conference on Autonomic Computing, 2005.

Zhou, et al., "An Adaptive Process Allocation Strategy for Proportional Responsiveness . . . " Proceedings of the IEEE International Conference on Web Services, 2004.

* cited by examiner

METHOD AND APPARATUS FOR POLICY-BASED PROVISIONING IN A VIRTUALIZED SERVICE DELIVERY ENVIRONMENT

BACKGROUND OF THE INVENTION

1. Field of the Invention

The present invention relates generally to data processing systems and more particularly to a computer implemented method for software and systems management in networked computer environments. Still more particularly, the present invention provides a computer implemented method, data processing system, and computer usable program code for providing policy-based provisioning in a virtualized service delivery environment.

2. Description of the Related Art

Virtualization is being extensively used in the datacenters for the hosting of customer applications since it offers the promise of increased server utilization, and ease of management. However, as solutions become increasingly complex, deployment of each solution requires allocation and provisioning of servers across different application tiers, i.e., multiple software stacks need to be installed across multiple application tiers. By default, datacenters use the fastest provisioning policy, which implies that the deployment of the middleware is started on the server as soon as a server is available. Due to differences in the duration to install different middleware components, installation on the servers in some application tiers completes before others. However, the solution cannot still be configured and enabled until all the servers across the tiers are ready. As a result of using this strategy, servers across different tiers are idle during the provisioning of the solution. Extending a similar strategy for use when the datacenter uses virtualization also results in wasted server utilization.

In the state of the art, two approaches are used for provisioning (1) Provision from scratch in a virtualized environment, and (2) Use of freeze dried Virtual Machine(VM) stacks for hosting of the solutions. In (1), the speed of provisioning the solution is determined by the individual VM configuration, and time to deploy the complete solution is determined by the component that requires the most time to install. Once the provisioning run has started, the VMs are left to run to completion. While the slowest component is installing, the other servers hosting the VM lay idle. In (2), predefined VM images are used to create and start virtual machines. The weakness of this approach is that it requires that various permutation of images to be pre-created and pre-configured for use. This creates a management nightmare whenever any patches for a particular component need to be applied as all images that use that component need to be recreated.

SUMMARY OF THE INVENTION

Accordingly, this invention provides for a method and apparatus for providing policy based provisioning of middleware components that satisfy a selected configuration policy for a selected solution in a distributed computing network. With this invention, the middleware components that are necessary to provide the solution are determined. Then, the configurations of the computers are determined so as to satisfy a selected configuration policy for a selected solution. Finally, the necessary middleware components are installed on the configured computers so that the solution can be provided, which conforms to the configuration policy.

Some of the selected configuration policies could be as follows: maximization of server utilization policy, provisioning of software components requiring external access based on availability of external resources, and minimization of total time to install said determined components.

The progress of installation of the middleware components can also be monitored to make any necessary adjustments in the configuration of the virtual machines so that the selected configuration policy can be satisfied.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of the illustrative embodiments when read in conjunction with the accompanying drawings, wherein:

DETAILED DESCRIPTION OF THE PREFERRED EMBODIMENT

Figure 1:
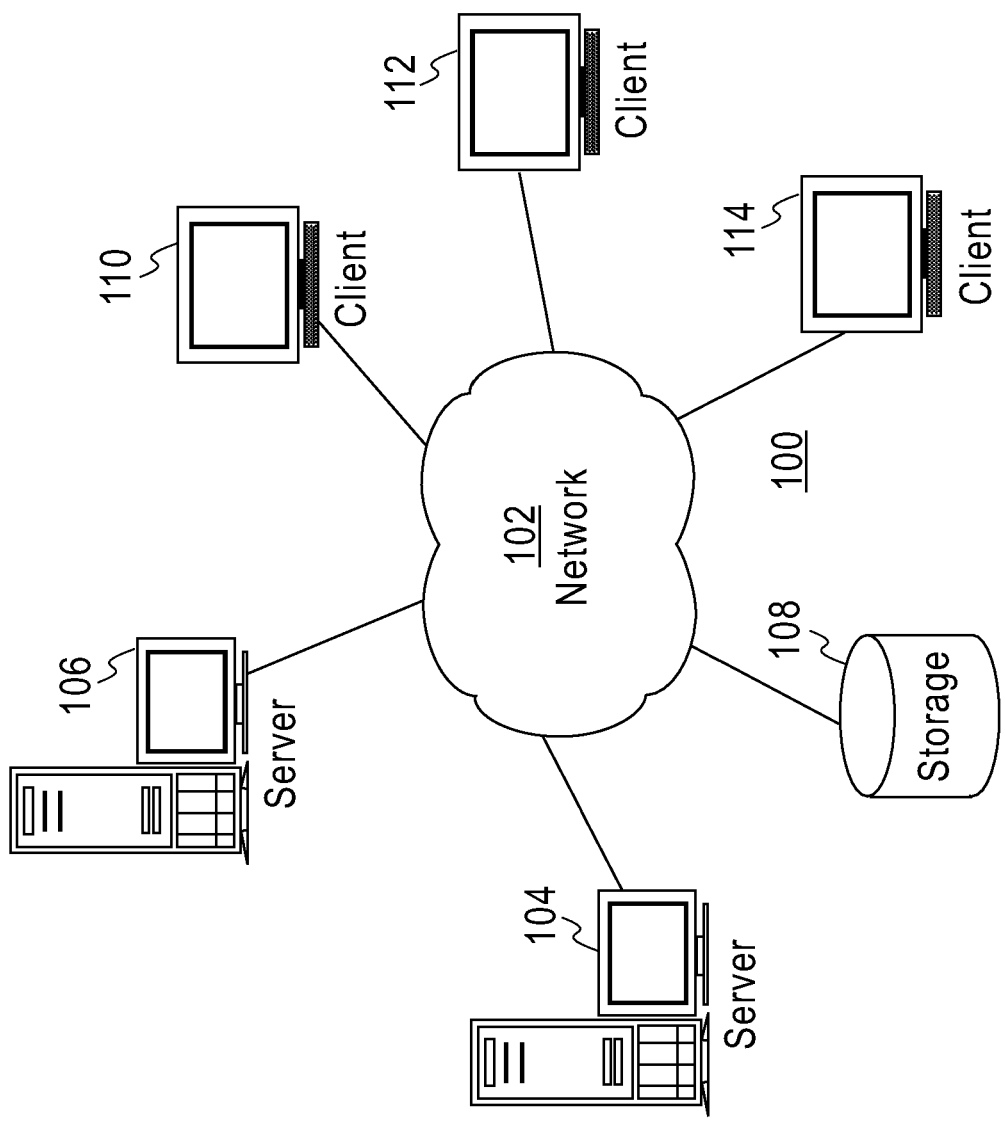
FIG. 1 depicts a pictorial representation of a network of data processing systems in which illustrative embodiments may be implemented.
Figure 2:
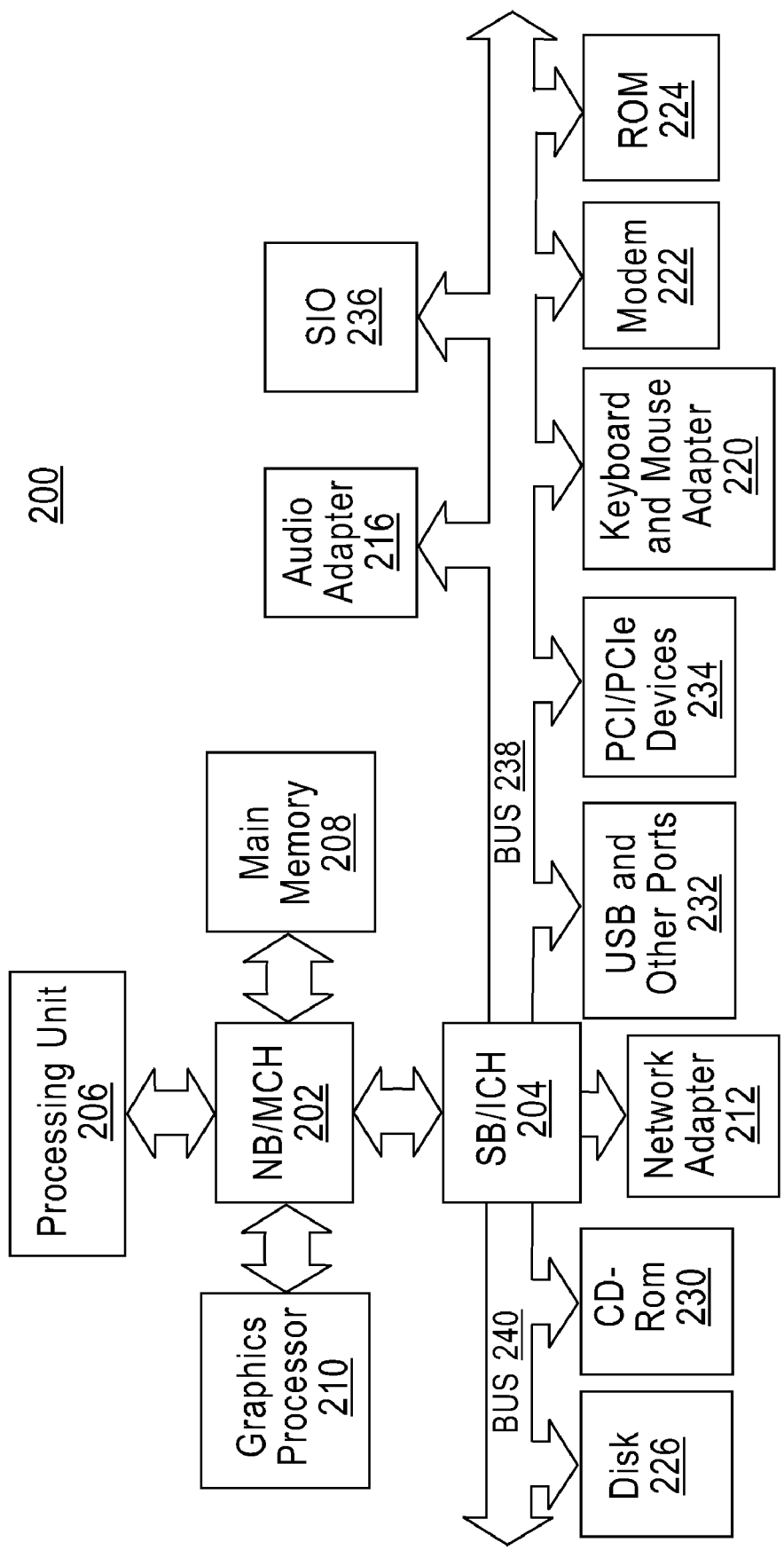
FIG. 2 depicts a block diagram of a data processing system in which illustrative embodiments may be implemented.

With reference now to the figures and in particular with reference to FIGS. 1-2, exemplary diagrams of data processing environments are provided in which embodiments may be implemented. It should be appreciated that FIGS. 1-2 are only exemplary and are not intended to assert or imply any limitation with regard to the environments in which embodiments may be implemented. Many modifications to the depicted environments may be made without departing from the spirit and scope of the illustrative embodiments.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes for embodiments may be located.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide for a computer implemented method, data processing system, and computer usable program code for compiling source code. The computer implemented methods of the illustrative embodiments may be performed in a data processing system, such as data processing system 100 shown in FIG. 1 or data processing system 200 shown in FIG. 2.

Figure 3:
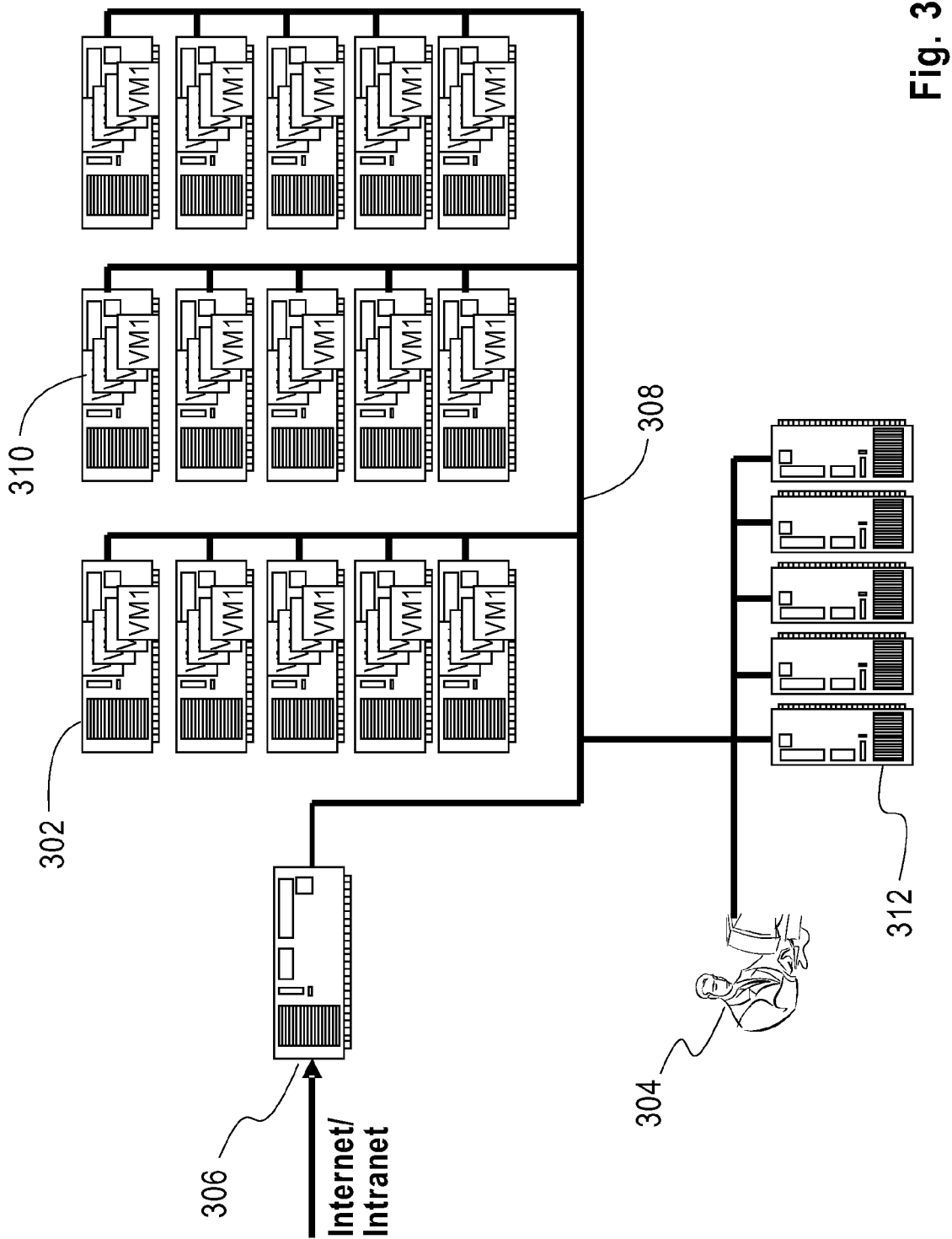
FIG. 3 depicts a schematic representation of virtualized service delivery environment in accordance with an illustrative embodiment.
Figure 4:
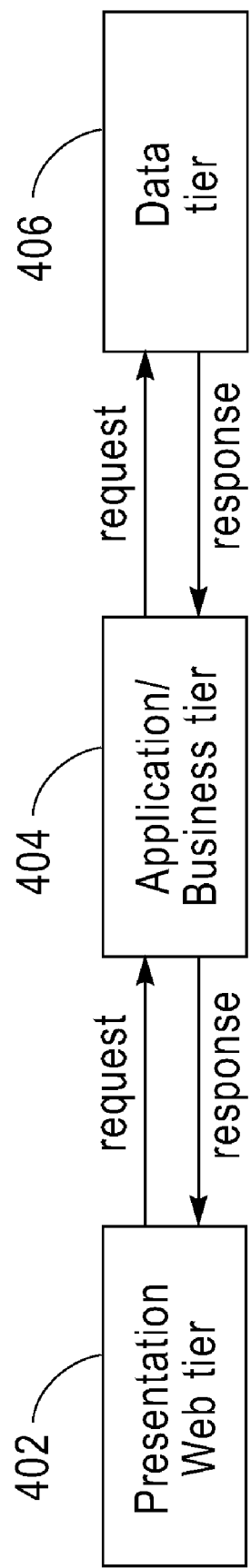
FIG. 4 shows the three tiers of a solution in accordance with an illustrative embodiment.

FIG. 3 depicts a schematic representation of virtualized service delivery environment in accordance with an illustrative embodiment. Requests from the Internet/Intranet are received by a Router device 306 located in the DMZ. The router device is typically implemented by a Reverse Proxy such as IBM's WebSeal software. These requests from users are then directed to the solution hosted on a collection of Virtual machines (310) running on a farm of physical servers (302) via a network 308. System administrators 304 manage and monitor the server farm with the help of management servers 312. The management servers run software to help with the provisioning, monitoring, metering, and problem determination of the server farm. FIG. 4 the three tiers of an application solution in accordance with an illustrative embodiment. An example of an application solution could be the maintaining of a database of customer account information in a savings and loan institution. The first tier is the presentation or Web tier 402. It deals with the interactions with a user, and contains HTML pages, images as well as code to display and process the pages such as portlets and/or servlets. A typical interaction with the presentation tier is via a web browser. This embodiment will work with multitier (n-tier) architectures, for simplicity it is illustrated with 3 tiers.

The second tier is known as the application or business tier 404, which processes the requests of all clients. It is embodied by the actual J2EE application or a business process that performs all functionality specific to the solution.

The third tier is called the database tier 406, which contains components to manage, and persist all data specific to a solution.

Figure 5:
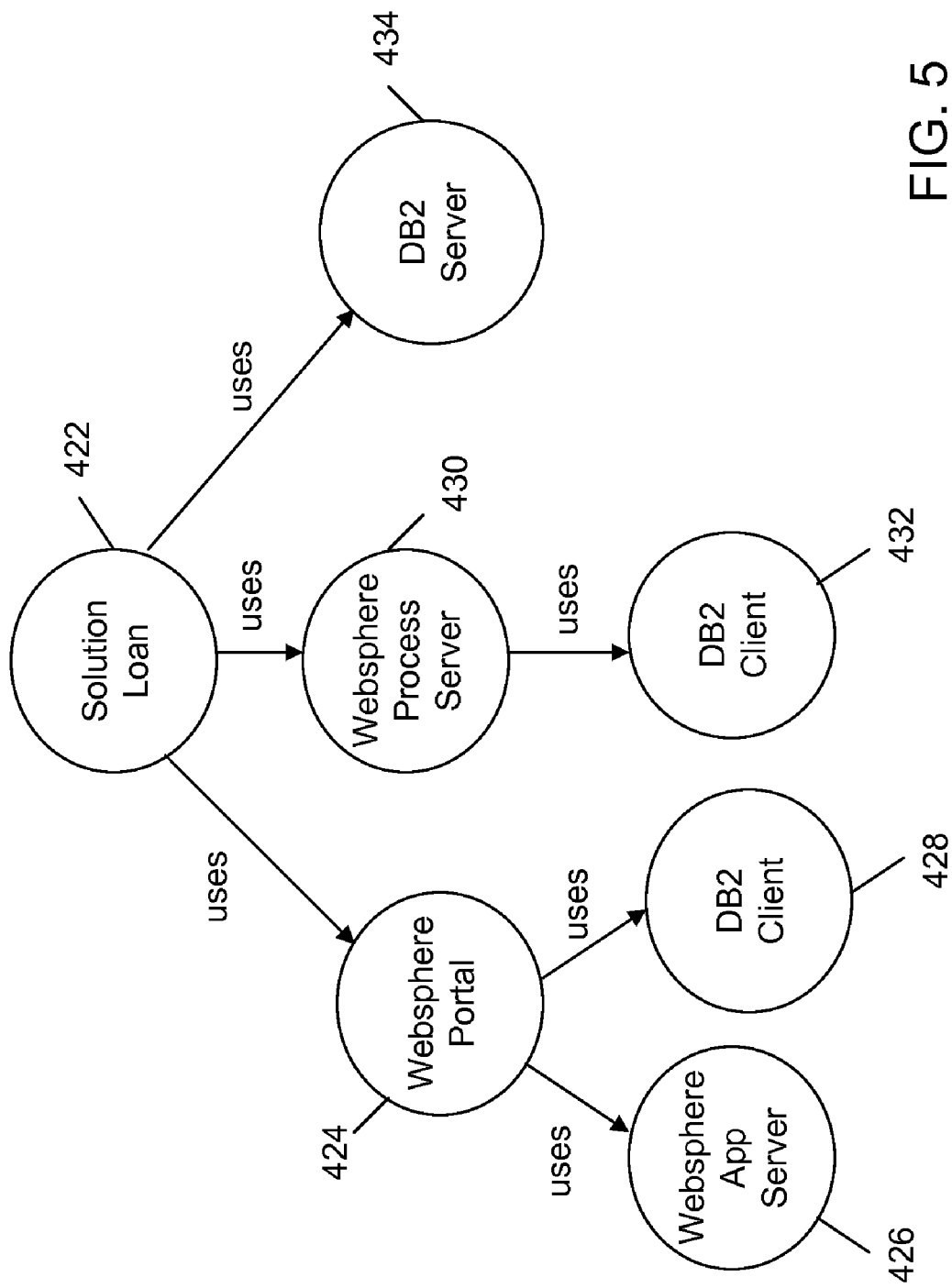
FIG. 5 depicts an example of a dependency graph that a solution provides for use in the illustrative embodiment

FIG. 5 depicts an example of a dependency graph that a solution provides for use in the illustrative embodiment. A dependency graph is expressed as an XML file that highlights the relationships and dependencies between different components. In the figure, the "Loan Solution" 422 depends on the availability of three components, WebSphere Portal Server 424, WebSphere Process Server 430, and a DB2 server 434. Further, the WebSphere Portal Server 424 depends on the availability of WebSphere Application Server 426, and DB2 client 428, while the WebSphere Process Server depends upon DB2 client 432.

Figure 6:
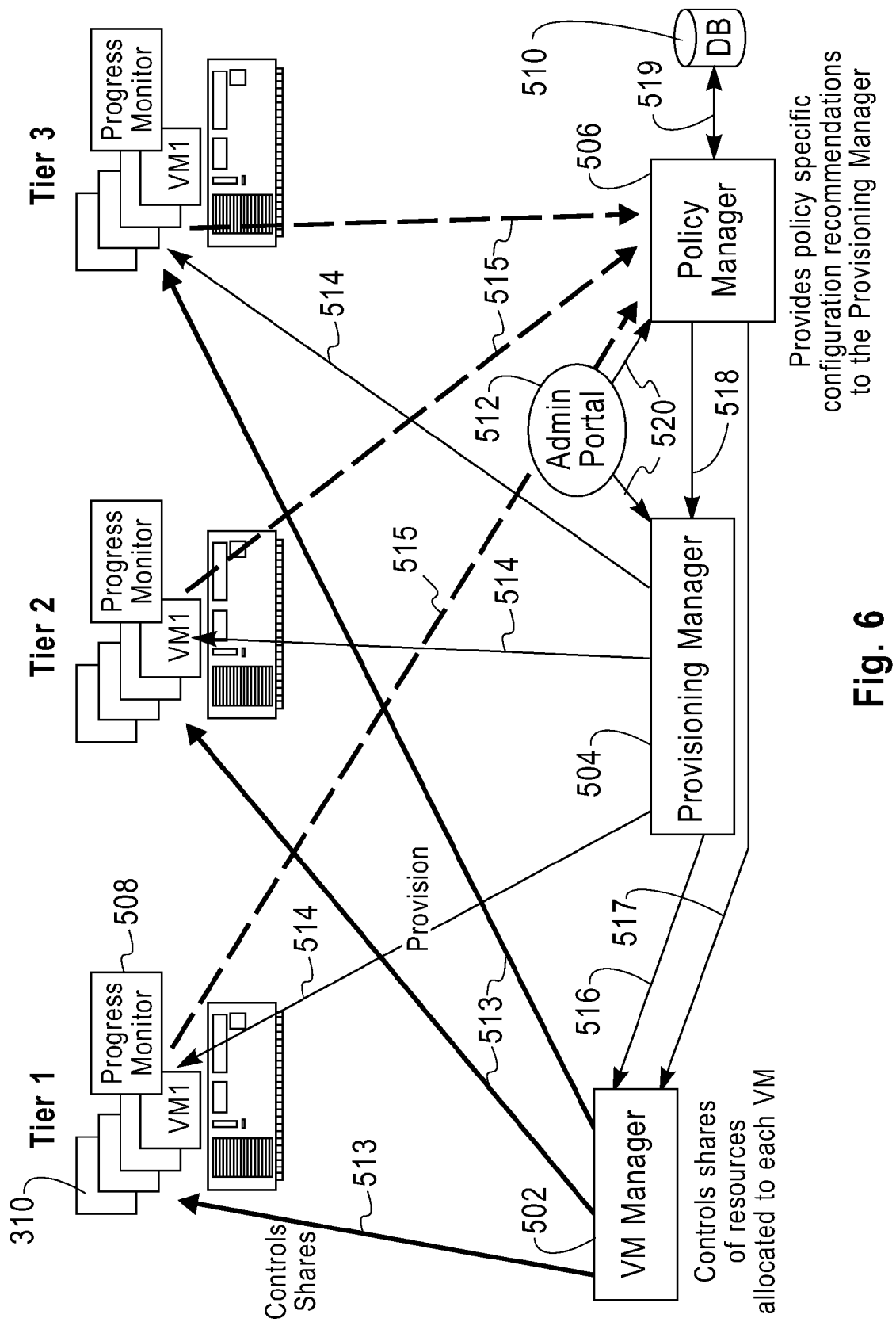
FIG. 6 depicts a schematic representation of the logical architecture of a policy-based management system in accordance with an illustrative embodiment.

FIG. 6 depicts a schematic representation of the logical architecture of a policy-based management system in accordance with an illustrative embodiment. The key component of the policy-management systems is the Provisioning Manager 504. As shown by arrows 516-518, and 520, it communicates with the Virtual Machine Manager 502, and a Policy Manager component 506. An Administration Portal 512 is available to interact with the Provisioning Manager and the Policy Manager as shown by arrows 520. The Policy Manager uses a repository 510 for persisting the needed policies and configuration information. See arrows 519. The Virtual Machine Manager 502 is responsible for creating and managing virtual machines used by the Provisioning Manager for deployment of the solution. See arrows 513. The Policy Manager component 506 is responsible for generating the Virtual Machine configuration that the Provisioning Manager uses to start the deployment of the solution. Further, the Policy Manager component also monitors the progress of provisioning of the individual middleware components (See arrows 515), and recommends to the Provisioning Manager adjustments to the Virtual Machines that need to be made to ensure that the provisioning of the middleware components is consistent with the policy settings assigned for a particular deployment.

Figure 7:
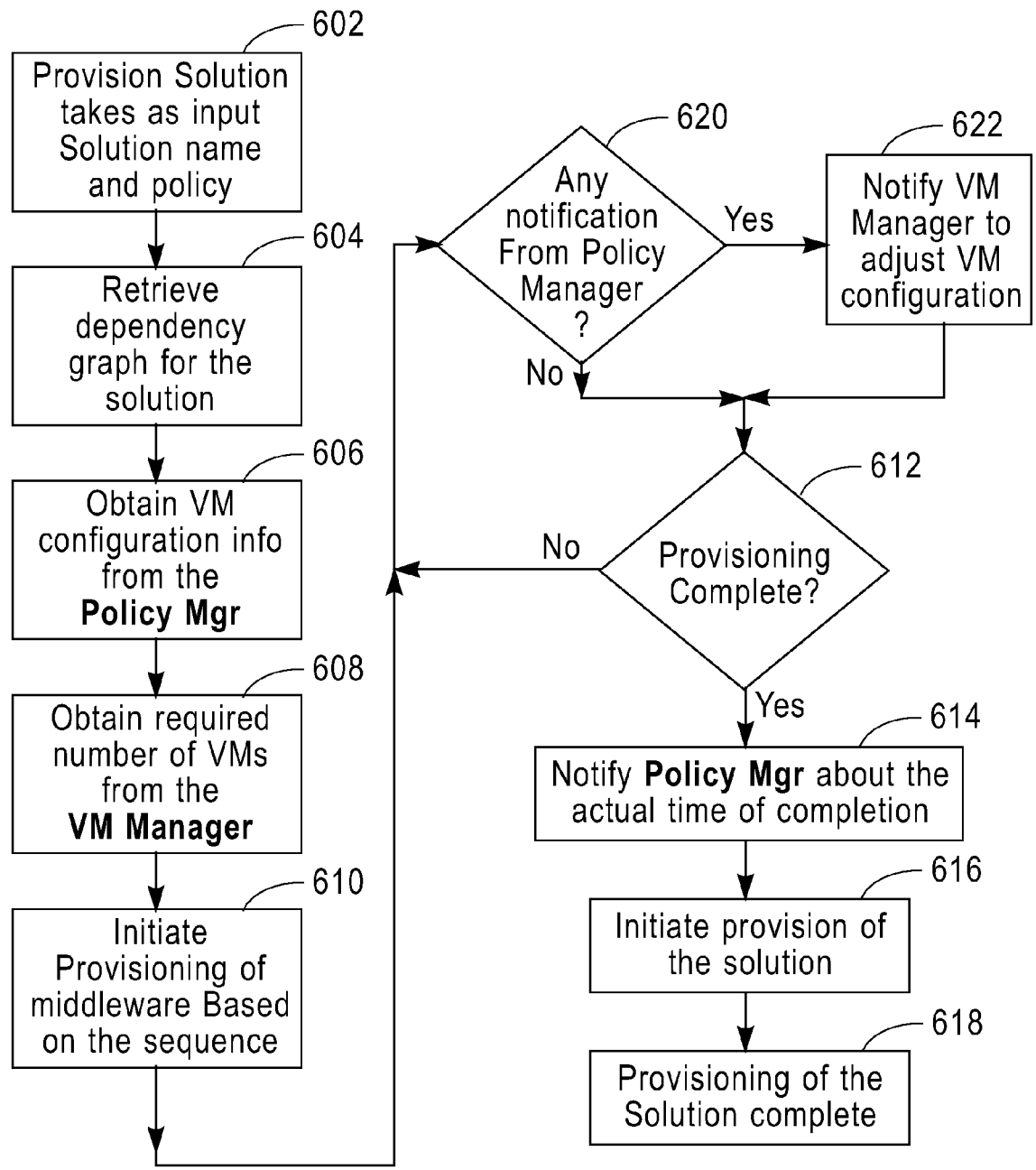
FIG. 7 is a flowchart illustrating the steps performed by the Provisioning Manager in accordance with an illustrative embodiment.

FIG. 7 is a flowchart illustrating the steps performed by the Provisioning Manager in accordance with an illustrative embodiment. When a Provision solution request is received by the Provisioning Manager, (602) along with the preferred policy name, from the Admin Portal (or an external source), the Provisioning Manager retrieves the dependency graph for the solution from the configuration repository (604). This step assumes that the Provisioning Manager knows about the solution that needs to be deployed. The initialization of the system via the Administration Portal is described later. The dependency graph lists the middleware components that need to be installed on the three tiers before installing the solution. The Provisioning Manager passes the dependency information and the selected policy name to the Policy Manager to obtain (606) the sequence of middleware components to be installed and the initial VM configuration for the VMs that need (608) to be created on the three application tiers. The Provisioning Manager requests the VM Manager to create VMs with the specified configuration. After the VMs have been created and setup, the Provisioning Manager starts deploying the middleware components on the VMs 610. See arrows 514. In step 620, the Provisioning Manager waits for notification from the Policy Manager about changes to the VM configuration parameters. If it receives such a notification then in step 622, the Provisioning Manager notifies the VM Manager to make such changes. In step 612, the Provisioning Manager checks to see if all of the provisioning to complete. After completion, it notifies (614) the Policy Manager about the actual time of completion of the components. In step 616, the Provisioning Manager starts the installation of the application solution on the three tiers on top of the middleware components, and in step 618, the Provisioning Manager completes the installation.

Figure 8:
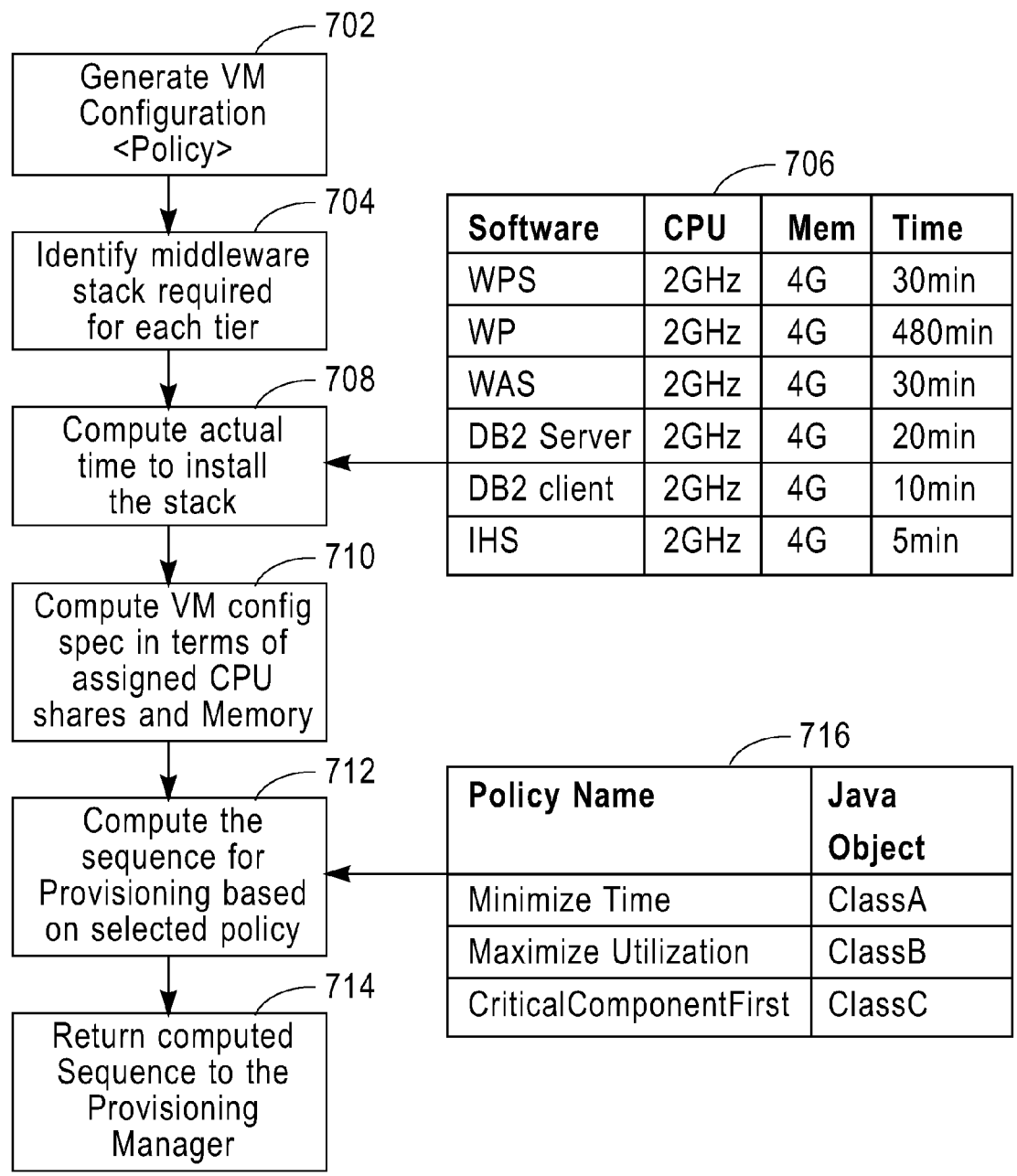
FIG. 8 is a flowchart illustrating the steps performed by the Policy Manager in accordance with an illustrative embodiment.

FIG. 8 is a flowchart illustrating the steps performed by the Policy Manager in accordance with an illustrative embodiment. When the Policy Manager receives a "Generate VM Configuration" request along with a specific policy from Provisioning Manager, (702) it identifies the middleware requirements for the solution, (704) and determines the number of Virtual machines that are needed. Next, based on the assigned software stack, and the associated policy, the Policy Manager computes the configuration of the VMs. For example, if the policy indicates maximization of server utilization, then the time required to provision the stack on the set of virtual machines is computed. (708, 710) To carry out this computation, the Policy Manager uses a table 706 that stores information about the typical installation time for different middleware components in the system. For example, a row from table 706 states that installing WPS on a 2 GHz machine with 4 GB memory takes about 30 minutes. This data is used to calculate the total time taken to install the middleware stack across the three application tiers. For example, if tier 1 VM needs WP, tier 2 VM needs WPS and DB2 client, and tier 3 VM needs a DB2 server then the total time for each of the three tiers is 480 minutes, 40 min, and 20 minutes respectively. This information, along with the actual CPU speeds of the physical servers where the VMs will be executing, is then used to compute the number of CPU shares and Memory that should be assigned to each VM such that the middleware installation on each of the three tiers completes almost simultaneously. An algorithm to compute the VM shares for a policy that mandates that all of the middleware installation completes at the same time is to compute the shares based upon the ratio of the expected total time of installation. For this example, the ratio of shares allocated to the three tiers is 480:40:20. Based on the policy, the Policy Manager also computes the sequence in which the selected machines should be provisioned. (712) The algorithms to generate this sequence are encoded in Java classes, which generate specific deployment sequence based on the number of VMs assigned to the request. The computed VM configuration and the sequence are returned to the Provisioning Manager. The Provisioning Manager passes the configuration information to the VM Manager to create the virtual machines, and uses the sequence information to initiate the deployment of the middleware on the VMs. The computed sequence is returned to the Provisioning Manager in step 714.

The preferred embodiment discusses the "maximize" server utilization policy. The Policy Manager implements several other policies such as:
1. Provisioning of components requiring external access based on availability of external resource (DB2 server).
2. Completion of base install first and optional components that can be shared by applications later.
3. Minimization of total time required to install the middleware components.

The Policy Manager can also support global policies which can then be converted to low level policies to specify when exactly the resources need to be reallocated (if difference between times-to-completion>some specified number) and what percentage of resources need to be reallocated. Also, if time-to-completion-of-tier-1 is less than<some specific time (5 minutes), then let tier-1 provisioning complete so that all of its resources will be used. The same method could be used for cases when multiple solutions need to be provisioned and if some middleware is common; in this case, the policies could specify the conditions under which the resources could be taken from the common middleware.

After the VMs have been created by the VM manager, the Provisioning Manger also installs on each VM a "Progress Monitor" 508 component. This component is responsible for periodically notifying the Policy Manager about the progress of the installation for each middleware component. The progress is reported in terms of <middleware component> <percent completed>, and sent to the Policy Manager, which tracks the progress of each request. The Progress Monitor can be implemented by those of ordinary skill in the art. For example, software products from the IBM Corporation or BMC Software Inc. can be used.

Figure 9:
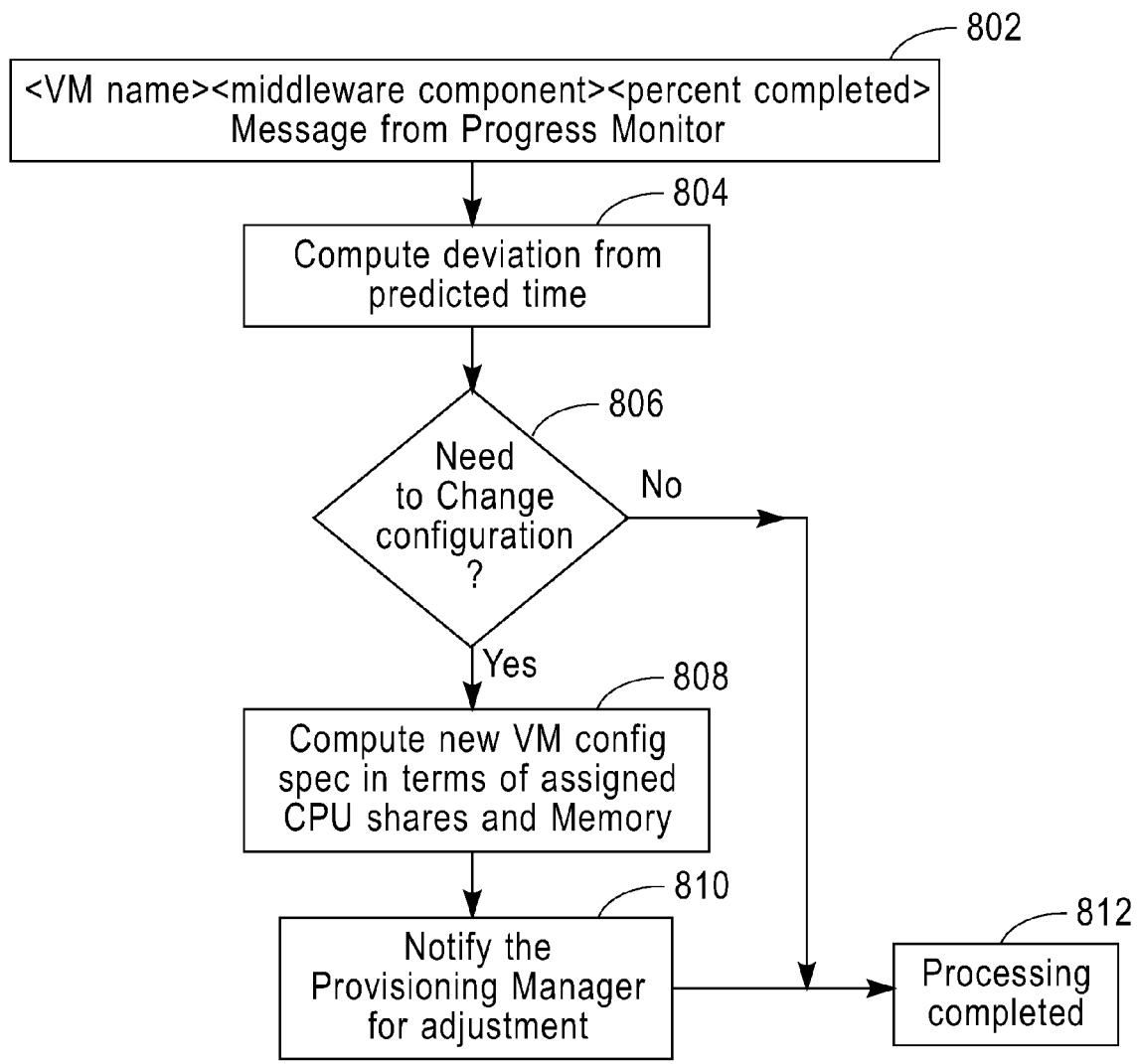
FIG. 9 is a flowchart illustrating the steps performed by the Policy Manager in response to a notification from the Progress monitor in accordance with an illustrative embodiment.

After the "Progress monitor" component has been installed, the Provisioning Manager starts provisioning of the stack across all the VMs as dictated by the sequence generated by the Policy Manager. The "Progress Monitor" receives installer events and/or monitors the logs from the different components and reports percent completed information for each to the policy manager. These indications may be irregular. The uneven rate of progress is smoothed out and during longer intervals a timed report that contains an estimated percent complete is sent. FIG. 9 is a flowchart illustrating the steps performed by the Policy Manager in response to a notification from the Progress monitor in accordance with an illustrative embodiment. Based on this reported data 802, the Policy Manager recomputes the objective function associated with the policy and computes the deviation 804 of the predicated value computed using the objective function from the actual value recomputed as a result of using the objective function.

In step 806, the Policy Manager determines whether an adjustment is needed, such as when there is a significant deviation. For any such significant deviation, the Policy Manager recomputes 808 the VM configuration and notifies the Provisioning Manager of the new configurations 810. The Provisioning Manager coordinates with the VM Manager to dynamically adjust the VM configurations based on the newly computed values. Step 812 marks the completion of processing of the message.

The Administration Portal provides means to initialize and manage the provisioning process. The Administration Portal 512 of FIG. 6 is a web application that provides a means to populate the Policy Manager with policy information (Table 716 of FIG. 8), and information about times to install various software products (Table 706 of FIG. 8). The Administration Portal also provides a means to publish solution information into the Provisioning Manager along with its dependency graph.

In a preferred embodiment, we use the CPU allocation for the Virtual Machines to demonstrate the novelty of the invention; however this will work by tuning other resources such as memory, network access speed, hard disk access speed, etc.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. In a distributed computing network having a plurality of computers interconnected with each other and a storage device, a method of providing policy based provisioning of middleware components to provide a solution, said method comprising:

determining a selection of said middleware components that are necessary to provide said solution from said storage device;

determining a predictive time for each of said selected middleware components to be installed on respective ones of each of a number of said computers;

installing each of said selected middleware components on said number of computers so that each said selected middleware component installation is completed at approximately the same time;

monitoring the progress of installation of each of said selected middleware components during said installing;
computing a deviation of the predictive time from an actual time based on said monitoring; and
dynamically adjusting the configuration of said number of said computers during said installing by adjusting at least one of the following parameters of a virtual machine of each of said number of said computers: memory size, disk size, and percent usage of a central processing unit so that each said selected middleware component installation is completed at approximately the same time.

2. A method according to claim 1, further comprising:
computing an actual time to install said middleware components; and
receiving events or monitoring logs from different progress monitors.

3. A program storage device readable by a plurality of computers interconnected with each other in a distributed computing network, said device having a program of instructions which are tangibly embodied on said storage device and which are executable by said computers, to perform a method of providing policy based provisioning of middleware components to provide a solution, said method comprising:
determining a selection of said middleware components that are necessary to provide said solution;
determining the configuration of each of a number of said computers on which said selected middleware components are to be deployed so as to satisfy a selected configuration policy;
installing said selected middleware components on said number of said computers;
monitoring the progress of installation of each of said selected middleware components during said installing; and
computing a deviation of a predictive value associated with said selected configuration policy from an actual value based on said monitoring;
recomputing an objective function of said selected configuration policy; and
dynamically adjusting the configuration of said number of said computers during said installing by adjusting at least one of the following parameters of a virtual machine of each of said number of said computers: memory size, disk size, and percent usage of a central processing unit to satisfy said selected configuration policy.

4. A method as recited in claim 3, wherein said selected configuration policy comprises at least one of the following: maximization of server utilization for servers on which virtual machines are setup, provisioning of software components requiring external access based on availability of external resources, and minimization of total time to install said determined components.

5. A method of providing policy based provisioning of middleware components to provide a solution, said method comprising:
determining middleware components that are necessary to provide a solution by accessing a storage device;
determining an initial configuration of virtual machines for a plurality of computers on which the middleware components are to be deployed to satisfy a selected configuration policy for the solution;
generating a deployment sequence of the middleware components;
creating the virtual machines with the initial configuration;
installing a progress monitor on each virtual machine;
initiating deployment of the middleware components to the virtual machines;
monitoring the progress of installation of each middleware component on a virtual machine during said deployment;
computing a deviation of a predictive value associated with said selected configuration policy from an actual value based on said monitoring;
recomputing an objective function of said selected configuration policy;
dynamically adjusting the initial configuration of said virtual machines during said deployment to satisfy said selected configuration policy based on said recomputing; and
installing the solution on the middleware components.

6. A method according to claim 5, wherein said selected configuration policy comprises maximization of server utilization for servers on which the virtual machines are setup.

7. A method according to claim 5, wherein said selected configuration policy comprises provisioning of software components requiring external access based on availability of an external server.

8. A method according to claim 5, wherein said selected configuration policy comprises completion of a base install first and components that can be shared by applications later.

9. A method as recited in claim 5, wherein dynamically adjusting the initial configuration of said virtual machines comprises adjusting central processing unit shares of each virtual machine.

10. A method as recited in claim 5, wherein dynamically adjusting the initial configuration of said virtual machines comprises adjusting a memory size of each virtual machine.

11. A method as recited in claim 5, wherein dynamically adjusting the initial configuration of said virtual machines comprises adjusting a disk size of each virtual machine.

12. A method according to claim 5, wherein the selected configuration policy comprises minimization of total time required to install the middleware components.

13. A method according to claim 5, comprising:
computing an actual time to install the middleware components on the virtual machines;
receiving events or monitoring logs from different progress monitors;
computing a deviation of a predicted time from the actual time;
recomputing the configuration of said virtual machines; and
dynamically adjusting the configuration of said virtual machines to satisfy said selected configuration policy.

14. A method according to claim 5, wherein said dynamically adjusting comprises tuning central processing unit shares, memory size, network access speed, or hard disk access speed for the virtual machines.

15. A method according to claim 5, comprising:
receiving an application solution request;
retrieving a dependency graph listing the middleware components for the application solution;
computing an actual time to install the middleware components on the virtual machines via a table comprising information about times to install software products; and
determining the deployment sequence of the middleware components and the initial configuration of the virtual machines via a table comprising algorithms for different configuration policies.

* * * * *